US 6,400,995 B1

(12) United States Patent
Patterson et al.

(10) Patent No.: US 6,400,995 B1
(45) Date of Patent: Jun. 4, 2002

(54) RODENT CONTROL DEVICE

(75) Inventors: Charles R. Patterson, Trenton, MO (US); Thomas D. Cline, Jr., Dallas Center, IA (US)

(73) Assignee: Global Instruments Ltd., Trenton, MO (US)

(*) Notice: Subject to any disclaimer, the term of this patent is extended or adjusted under 35 U.S.C. 154(b) by 0 days.

(21) Appl. No.: 09/309,116

(22) Filed: May 10, 1999

(51) Int. Cl.[7] .......................... G05B 9/02; A01M 29/00; A01K 15/04; H01H 47/00
(52) U.S. Cl. .......................... 700/79; 43/124; 119/720; 361/143
(58) Field of Search .............................. 700/73, 79, 80; 367/139; 340/384.2, 573.2; 361/143; 116/22 A; 119/720, 721; 43/124

(56) References Cited

U.S. PATENT DOCUMENTS

| 4,215,429 A | 7/1980 | Riach |
| 4,338,593 A | 7/1982 | Mills |
| 4,414,653 A | 11/1983 | Pettinger |
| 4,802,057 A | 1/1989 | Patterson |
| 5,473,836 A | * 12/1995 | Liu .............................. 43/124 |
| 6,111,514 A | * 8/2000 | Cossins et al. ............. 340/654 |
| 6,208,100 B1 | * 3/2001 | Griesemer et al. .......... 318/434 |
| 6,249,417 B1 | * 6/2001 | Pippen ....................... 361/139 |

* cited by examiner

Primary Examiner—William Grant
Assistant Examiner—Elliot Frank
(74) Attorney, Agent, or Firm—Shughart Thomson & Kilroy P.C.

(57) ABSTRACT

A rodent control device generates a pulsating, interrupted electromagnetic field via one or more coil(s) and induces it onto the power line wiring in a building via core(s) linked to the coil(s). The rodent control device circuit is microprocessor controlled which allows automatic sensing of line voltage cycle rates and precise control of coil switching circuitry. The coil(s) are connected to the microprocessor to provide a coil monitoring signal via which the microprocessor detects abnormalities in the coil(s) such as shorts or open circuits. Upon detection of such an abnormality, the microprocessor shuts off control signals to the coil and to an LED indicator until a normal coil condition is sensed. The microprocessor also provides a timed rest signal for shutting down the device for, for example, 2 minutes out of every 6 minute period as a power saving feature.

18 Claims, 5 Drawing Sheets

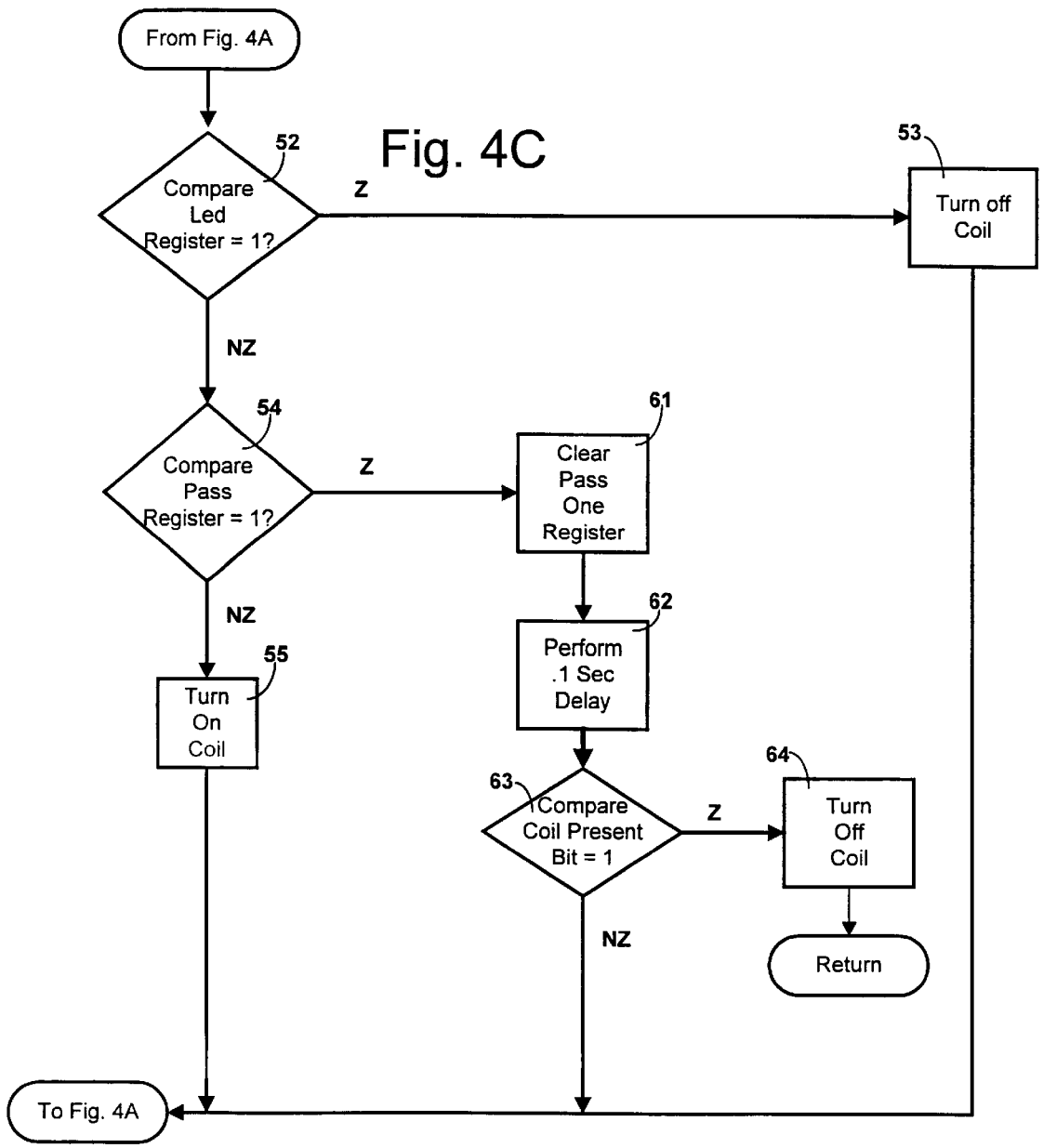

RODENT CONTROL DEVICE

FIELD OF THE INVENTION

The present invention relates to a rodent control device, and, more particularly, to such a rodent control device which generates a pulsating electromagnetic field within a building. The device is controlled by a programmed microprocessor which precisely cycles a coil on and off at a predetermined duty cycle rate while cycling the device itself on and off, detects and compensates for power line cycle rates by adjusting duty cycle rates of the pulsating field, and detects circuit abnormalities and shuts down or does not energize the coil or LED indicator in the event an abnormality is detected.

BACKGROUND OF THE INVENTION

A number of different electronic rodent control devices have been devised, which have been of varying degrees of effectiveness. U.S. Pat. No. 4,802,057, which is assigned to the present assignee, is an example of such a device. In the '057 patent, a rodent control device incorporates a low voltage integrated circuit timer to generate a pulsed output at an approximate frequency of one pulse per second, with the pulses being periodically stopped for an interim period. An opto-coupler receives the timed pulses from the timer circuit and, in turn, provides an output signal to a voltage dividing circuit which gates a triac switch. The triac is thus periodically switched on at the timed rate of about one pulse per second and, in response, completes a circuit from a first power lead through a coil to a second power lead via the triac. The coil has a core associated therewith which is connected to the second power lead and which induces a pulsed, interrupted electromagnetic field onto the power line such that the entire building wiring system becomes a radiator for the pulsed and interrupted electromagnetic field.

The rodent control device described in the '057 patent has proven to be a very successful consumer product. However, the circuit in the '057 patent is relatively expensive since it requires the use of discrete components, including the rather expensive opto-isolator. Furthermore, it would be desirable if the device could sense abnormal coil conditions, such as coil short and open circuits, and cease operation until normal coil conditions resume. Finally, due to varying line cycle conditions, it would be preferable if the device could automatically adapt its timing cycle for differing power line cycles.

The present invention is intended to be an improvement on the circuit described in the '057 patent.

SUMMARY OF THE INVENTION

The present invention is directed to a rodent control device which generates a pulsating, interrupted electromagnetic field via one or more coil(s) and induces it onto the power line wiring in a building via core(s) linked to the coil(s). The rodent control device uses a circuit controlled by a microprocessor which senses line voltage cycle rates and times the application of electromagnetic pulses to the power line based upon the line voltage cycle rate. The coil(s) are connected to the microprocessor to provide a coil monitoring function via which the microprocessor detects abnormalities in the coil(s) such as shorts or open circuits. Upon detection of such an abnormality, the microprocessor shuts off gate control signals to a coil switching triac and signals to an LED indicator until a normal coil condition is sensed. The microprocessor provides several precise timing cycles including a cycle for activating an LED indicator in synchronism with a time cycle for controlling the application of pulses to the coil(s). In addition, a device rest signal is generated by the microprocessor, for example, for 2 minutes out of every 6 minute period as a power saving feature.

OBJECTS AND ADVANTAGES OF THE INVENTION

The principal objects of the present invention include: providing an improved rodent control device; providing such a rodent control device which applies an accurately timed electromagnetic pulse to a power line to repel rodents; providing such a rodent control device which is controlled by a microprocessor; providing such a rodent control device which does not require an opto-isolator to isolate the logic circuitry from the line voltage; providing such a rodent control device which is self adapting based upon the particular cycle rate of the connected line voltage; providing such a rodent control device in which the microprocessor senses coil conditions and shuts off any gate control signals to a coil operating triac and to an LED indicator when abnormal coil conditions exist, such as short or open circuits; and providing such an rodent control device which is economical and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIGS. 4A, 4B, and 4C are flow chart diagrams illustrating the programmed logic of the microprocessor controlling the circuit of FIG. 2.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
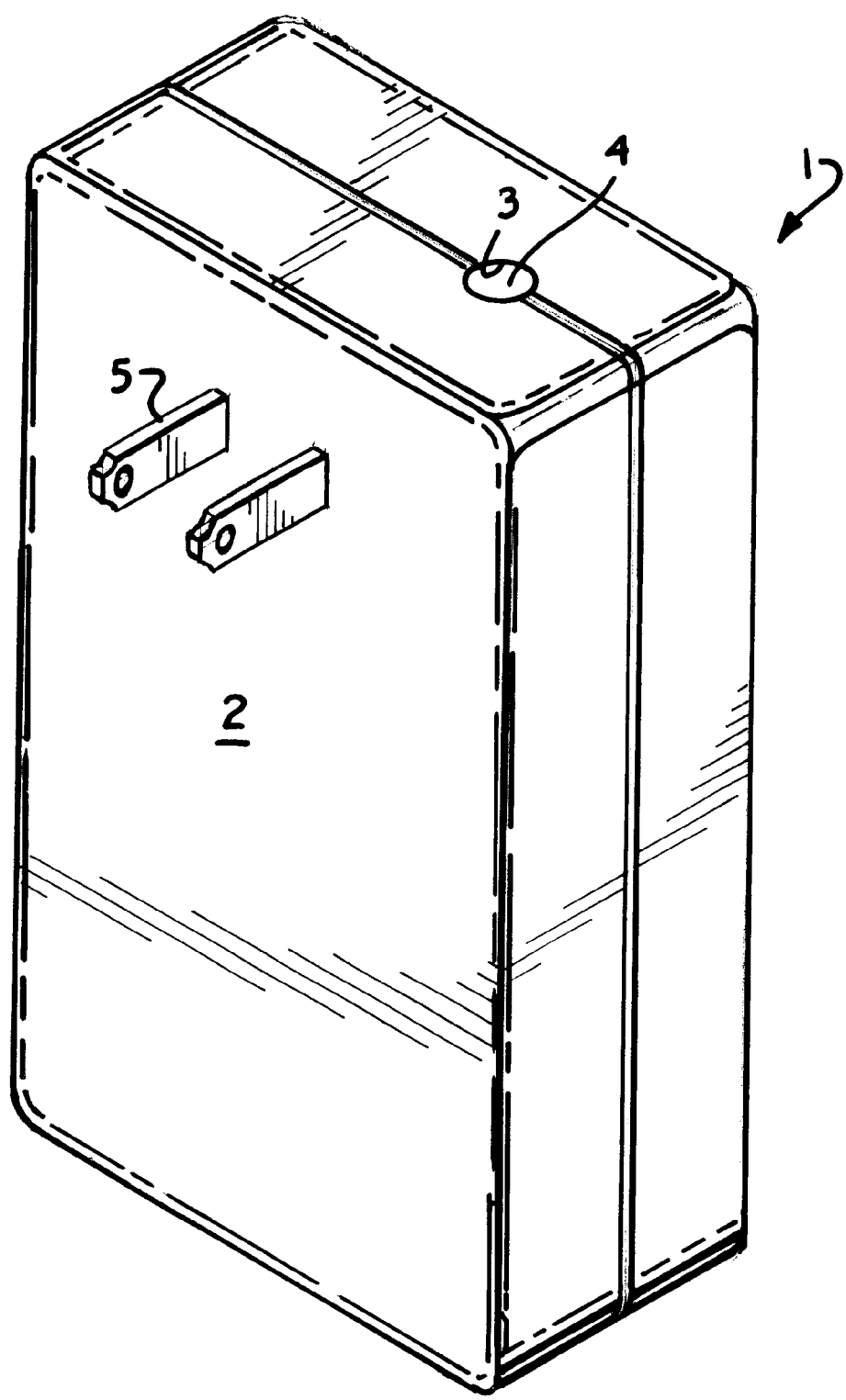
FIG. 1 is a perspective view of an improved rodent control device in accordance with the present invention.

Referring to FIG. 1, an inventive rodent control device is illustrated and generally indicated at 1. The rodent control device 1 is contained within a housing 2 with an opening 3 within which an LED indicator 4 is positioned. A standard male power plug 5 extends outward from the housing 2.

Figure 2:
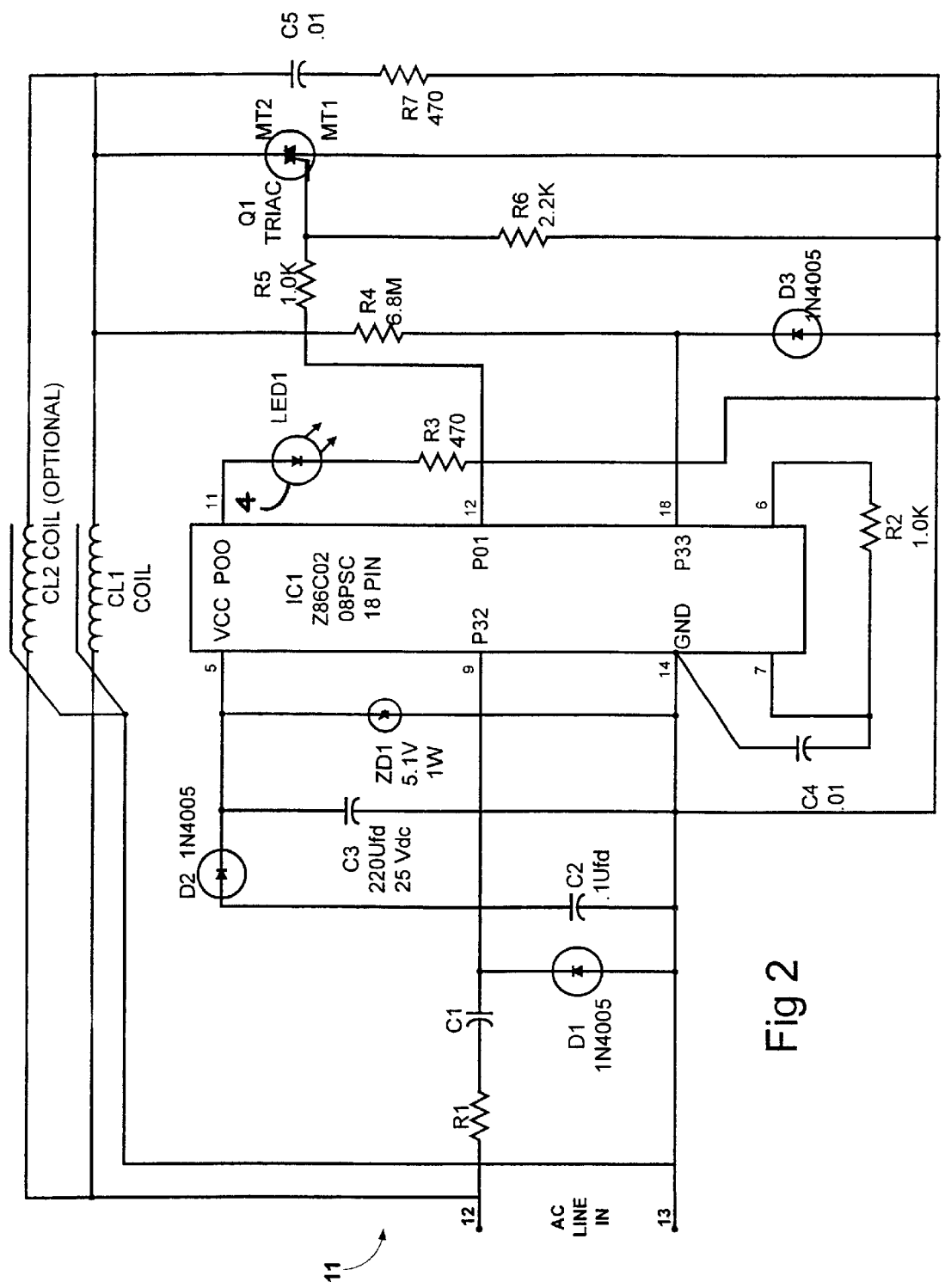
FIG. 2 is a schematic circuit diagram of the improved rodent control device of FIG. 1.

Referring to FIG. 2, a schematic diagram illustrates a circuit 11 of the rodent control device 1. In the circuit 1, ordinary 120 VAC household line voltage is applied between terminals 12 and 13. A resistor R1 and capacitor C1 provide a current limiting function. A power supply includes diodes D1 and D2, which form a full wave rectifier, capacitor C2, which provides a voltage spike elimination function, capacitor C3 is a filter while zener diode ZD1 limits voltage applied to VCC (pin 5) of microprocessor IC1 to 5 volts DC. Direct line voltage is applied from terminals 12, 13 to P32 (pin 9) and GND (pin 14) of the microprocessor IC1. P32 acts as an interrupt input for assessing line voltage frequency, as will be explained below.

Capacitor C4 and resistor R2 collectively provide a low cost clock connected to clock pins 6, 7 of the microprocessor IC1. P00 (pin 11) of the microprocessor IC1 is connected to LED1, which is the LED indicator 4 described above. P01 (pin 12) of the microprocessor IC1 provides an output gating signal to the triac Q1 via current limiting resistor R5. When the triac Q1 is gated ON by a high signal on pin P01, it closes a circuit from line voltage terminal 12, through coil CL1 and (optional) coil CL2, and back to line voltage terminal 13.

P33 (pin 18) of the microprocessor IC1, is a coil monitoring input connected via a coil monitoring lead to the junction between resistor R4 and diode D3. This coil monitoring input P33 senses coil conditions during periods when the triac Q1 is switched ON in order to detect abnormal conditions such as coil open or short circuits. In other words, when operation of the coil CL1 is normal, a high logical input will be impressed on pin P33, but abnormal conditions in the coil CL1 will result in a low logical input on pin P33.

Resistor R6 stabilizes the triac Q1 to insure that spurious signals on the pin P01 do not inadvertently trigger the triac Q1. Capacitor C5 and resistor R7 are a snubber circuit which prevents induction "kicks" from coils CL1 and C12 from latching up the triac Q1.

Figure 3:
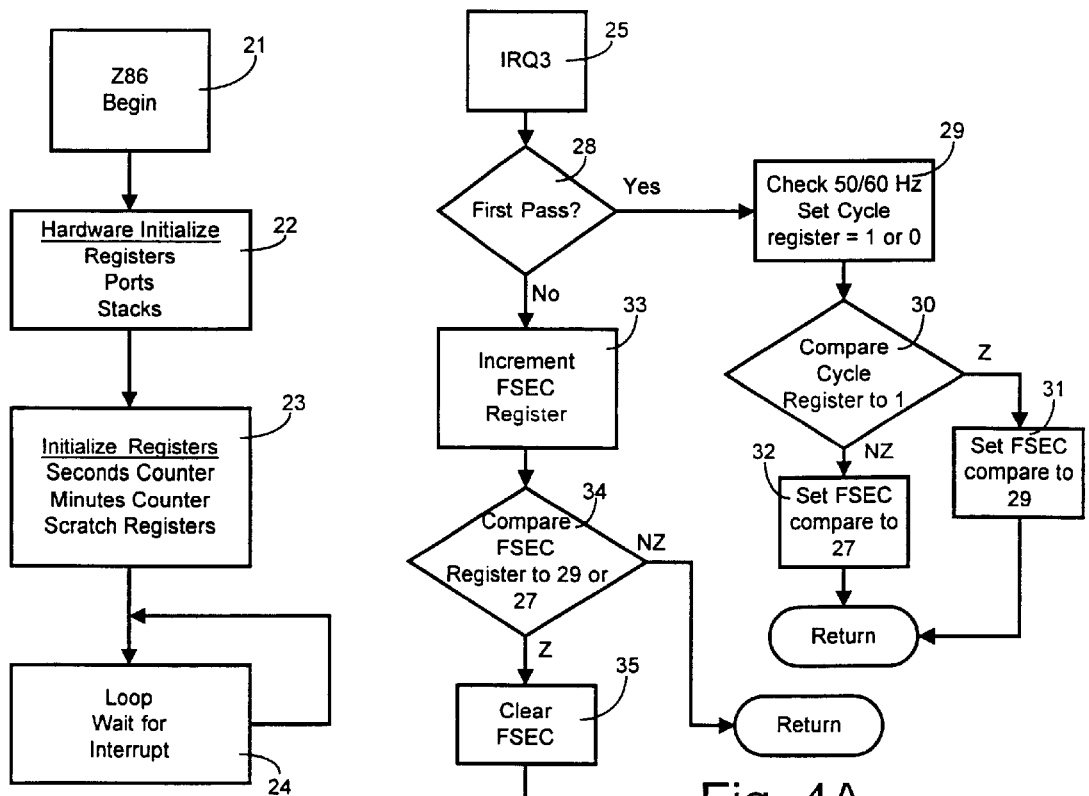
FIG. 3 is a flow chart diagram illustrating the start-up procedures for the microprocessor controlling the circuit of FIG. 2.

Referring to FIG. 3, an initial start-up loop for the microprocessor IC1 is illustrated. At block 21, the IC1, which can be a Z86 processor, is started up and, at block 22, the registers, ports and stacks are initialized, and, at block 23, the Seconds, Minutes, and Scratch Registers are initialized to their programmed initial values. Block 24 represents a "mumble mode" loop in which the microprocessor IC1 is waiting for a line voltage interrupt at pin P32.

Figure 4A:
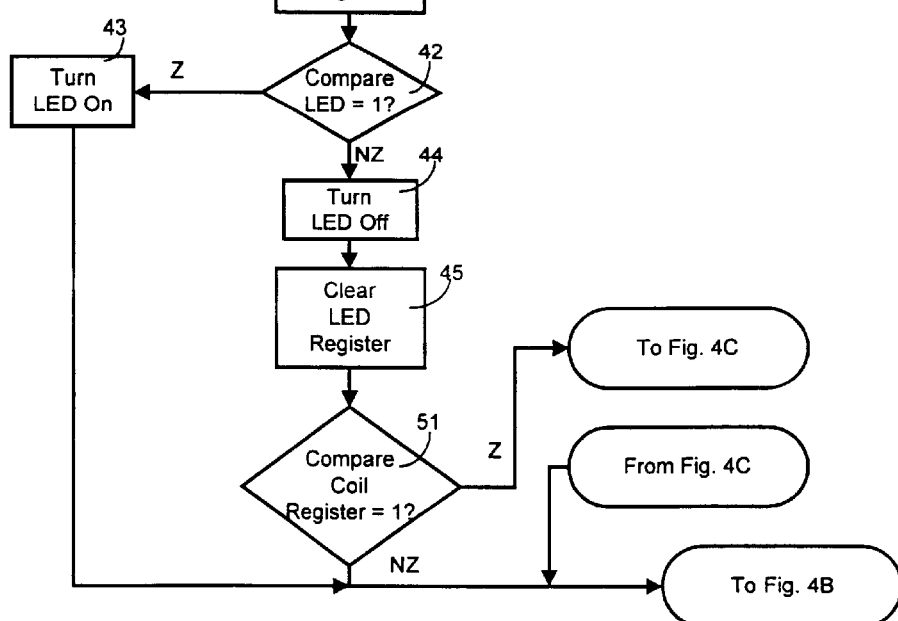
Figure 4B:
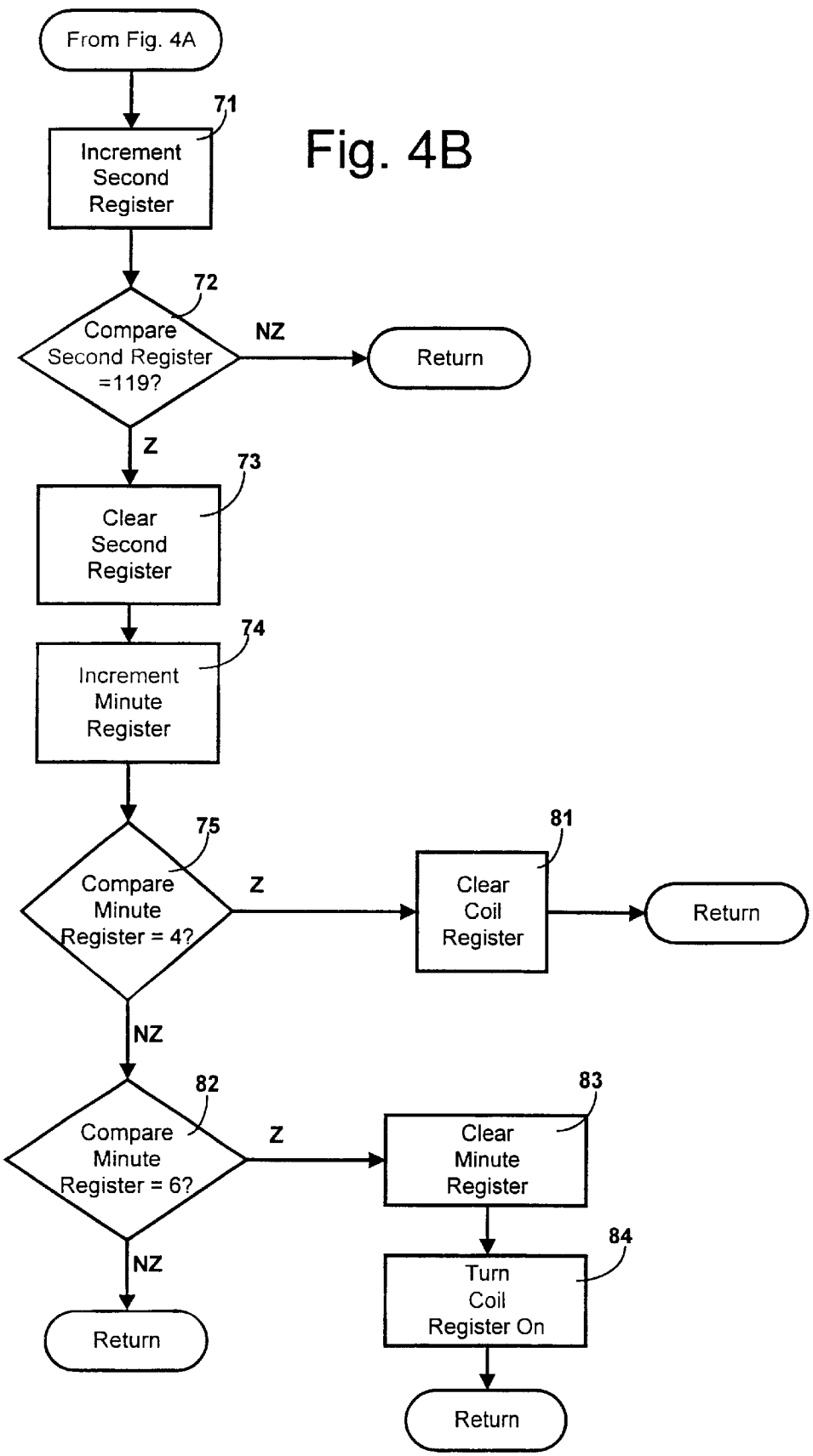

Referring to FIGS. 4A, 4B, and 4C, collectively form a logical flow chart of the program for the microprocessor IC1 after an initial line voltage interrupt (block 25) is sensed on pin P32. At block 28, a decision is made as to whether this is the first interrupt, and, if so, at block 29, the line cycle rate is checked. This is done by timing the interval between the first and second interrupts and setting a line cycle register to 1 if the cycle rate is 60 Hz and to 0 if the cycle rate is 50 Hz. This check is performed only on the first "Pass" or first two interrupt signals. At block 30, the line cycle register value is compared to 1, and, if 1, at block 31, the FSEC register comparison (block 34 described below) is set to 29, but if it is 0, at block 32, then the FSEC register comparison is set to 27.

As would be understood by a person skilled in assembler language programming, a compare block such as block 30, shown in FIG. 4A, represents a subtraction operation and the Z result indicates that the quantities compared were the same (i.e. that the difference was equal to zero). Conversely, the NZ result indicates that the quantities compared were not the same (i.e. that the difference was not zero).

After the first interrupt, at block 33, the FSEC register is incremented by 1. The FSEC register thus counts interrupts, which occur every half voltage cycle. At block 34, the FSEC register value is compared to 29 or 27, depending upon the line voltage cycle, and the cycle repeated until a count of 29 or 27 interrupts (approx. ½ second) is reached. Then, at block 35, the FSEC register is cleared, and, at block 41, the LED register is incremented. Only the least significant digit of the LED register is used, and, at block 42, this least significant bit is compared to 1. If it equals 1, then, at block 43, the LED indicator 4 (LED1) is turned On. By contrast, if the least significant bit of the LED register is 0, then, at block 44, the LED indicator 4 is turned Off and, at block 45, the LED register is cleared. The loop encompassed by the blocks 41–45 cycles the LED indicator 4 On for ½ second and then Off for the next ½ second.

At block 51, the least significant bit of the Coil Register is compared to 1, and, if it equals 1, then the coil operation loop of FIG. 4C is entered. If the least significant bit of the coil register is 0, then the time loop of FIG. 4B is entered.

Referring to FIG. 4C, at block 52, the LED register is again compared to 1 and, if equal to 1, then the coil CL1, and, optionally, the coil CL2 are turned Off, at block 53, by switching Off the triac Q1 via the pin P01 of the microprocessor IC1. If the LED register is not equal to 1, then, at block 54, the Pass One Register is compared to 1, and, if it does not equal 1, then, at block 55, the coil(s) CL1 and CL2 are turned On via the triac Q1. Conversely, if the Pass One register is not equal to 1, then, at block 61, the Pass One register is cleared and, at block 62, a 0.1 Second delay is instituted to allow time to check coil status. At block 63, the Coil Present register is compared to 1, and, if equal to 1, then at block 64, the coil(s) CL1 and CL2 are turned Off by switching Off the triac Q1 and the LED indicator 4 and the loop is returned to the top of FIG. 4A. Conversely, if the Coil Present register is not equal to 1, then the timing loop of FIG. 4B is entered, just as it is from blocks 53 and 55. The loop represented by FIG. 4C thus turns the coil off and on at the same rate as the LED indicator 4, if the coil present register is normal.

Referring to FIG. 4B, at block 71, the Seconds register is incremented, and, at block 72, the Seconds register is compared to the number 119. The loop of FIG. 4A is thus repeated until the Seconds register is equal to 119. When the Seconds register is equal to 119, indicating the lapse of 1 minute, then, at block 73, the Seconds register is cleared and, at block 74, the Minutes register is incremented. At block 75, the Minutes register is compared to 4, and, if equal to 4, then the coil register is cleared at block 81 and the loop returns to the top of FIG. 4A. Conversely, if the Minutes register is not equal to 4, then the Minutes register is compared to 6 at block 82. If it is equal to 6, then, at block 83, the Minutes register is cleared and, at block 84, the Coil register is turned back On (i.e. reset to 1) and the loop is returned to the top of FIG. 4A. If the Minutes register is not equal to 6, then the loop is also returned to the top of FIG. 4A. The loop represented in FIG. 4B, encompassing blocks 71–84, serves to cycle the rodent control device 1 such that it is activated for 4 minutes and then deactivated for 2 minutes. Clearly, any other On/Off cycle time can be set by varying the comparison steps 75 and 82.

While the rodent control device 1 has been described and illustrated in a particular embodiment, changes could be made to the circuitry or the digital logic without affecting the viability of the invention. For example, many different platforms and pin configurations can be used for the microprocessor IC1. Accordingly, it is thus to be understood that while certain forms of the present invention have been illustrated and described herein, it is not to be limited to the specific forms or arrangement of parts described and shown.

We claim:
1. A rodent control device, comprising:
a) an AC line voltage input with first and second power terminals being respectively connectable to corresponding first and second leads of an AC line voltage source;
b) a programmed microprocessor;
c) a power supply connected between said line voltage input and said microprocessor to provide rectified DC power to a power input of said microprocessor;
d) one of said first and second power terminals being connected to an interrupt input of said microprocessor to generate an interrupt with each cycle of said line voltage source;
e) a coil; and
f) a switch controlled by a gate connected to a control output of said microprocessor, said switch being operative, in response to a gate control signal from said microprocessor, to selectively close a circuit between one side of said coil and one of said first and second power terminals, an opposite side of said coil being connected to the other of said first and second power terminals, said microprocessor being programmed to periodically send said gate control signal to said gate based upon a predetermined timing cycle controlled by the frequency of line cycle signals received by said microprocessor interrupt input.

2. A rodent control device as in claim 1, and further comprising a ferrous metal core positioned proximate said coil and being attached to one of said first and second power terminals such that an electromagnetic pulse is impressed onto said AC line voltage source with each gate control signal applied to said switch gate by said microprocessor.

3. A rodent control device, comprising:
a) an AC line voltage input with first and second power terminals being respectively connectable to corresponding first and second leads of an AC line voltage source;
b) a programmed microprocessor;
c) a power supply connected between said line voltage input and said microprocessor to provide rectified DC power to a power input of said microprocessor;
d) one of said first and second power terminals being connected to an interrupt input of said microprocessor to generate an interrupt with each cycle of said line voltage source;
e) a coil;
f) a switch controlled by a gate connected to a control output of said microprocessor, said switch being operative, in response to a gate control signal from said microprocessor, to selectively close a circuit between one side of said coil and one of said first and second power terminals, an opposite side of said coil being connected to the other of said first and second power terminals, said microprocessor being programmed to periodically send said gate control signal to said gate based upon a predetermined timing cycle controlled by the frequency of line cycle signals received by said microprocessor interrupt input;
g) a coil monitoring input to said microprocessor;
h) a coil condition monitoring circuit connected between said one side of said coil and said one of said first and second power terminals; and
i) a lead connecting said coil condition monitoring circuit to said coil condition input, said microprocessor being programmed to cease sending said gate control signals to said switch gate as long as an abnormal coil condition is sensed by said coil condition monitoring circuit.

4. A rodent control device as in claim 3, wherein said coil condition monitoring circuit comprises a resistor and a diode connected in series between said one side of said coil and said one of said first and second power terminals one coil, said coil monitoring lead connecting between a junction between said resistor and diode and said coil monitoring input of said microprocessor.

5. A rodent control device as in claim 3, and further comprising:
a) an LED indicator connected between an output pin of said microprocessor and one of said first and second power terminals; wherein
b) said microprocessor is programmed to send control signals to light said LED indicator at the same rate as the gating pulses are applied to said gate and to stop sending control signals to light said LED when abnormal coil conditions are sensed by said microprocessor light said LED at the same rate as the gating pulses are applied to said gate.

6. A rodent control device as in claim 1, wherein there are a pair of coils connected in parallel between said switch and said other of said first and second power terminals.

7. A rodent control device as in claim 1, wherein:
a) said microprocessor is programmed to periodically stop production of said gate control signals for a predetermined time period and then to resume production of said gate control signals after said predetermined time period is over.

8. A rodent control device, comprising:
a) an AC line voltage input with first and second power terminals being respectively connectable to corresponding first and second leads of an AC line voltage source;
b) a programmed microprocessor;
c) a power supply connected between said line voltage input and said microprocessor to provide rectified DC power to a power input of said microprocessor;
d) a coil;
e) a switch controlled by a gate connected to a control output of said microprocessor, said switch being operative, in response to a gate control signal from said microprocessor, to selectively close a circuit between one side of said coil and one of said first and second power terminals, an opposite side of said coil being connected to the other of said first and second power terminals;
f) a ferrous metal core positioned proximate said coil and being attached to one of said first and second power terminals;
g) a coil monitoring input to said microprocessor;
h) a coil condition monitoring circuit connected between said one side of said coil and said one of said first and second power terminals; and
i) a lead connecting said coil condition monitoring circuit to said coil condition input, said microprocessor being programmed to cease sending said gate control signals to said switch gate as long as an abnormal coil condition is sensed by said coil condition monitoring circuit.

9. A rodent control device as in claim 8, wherein:
a) one of said first and second power terminals is connected to an interrupt input of said microprocessor to generate an interrupt with each cycle of said line voltage source; and b) said microprocessor is programmed to periodically send said gate control signal to said gate based upon a predetermined timing cycle controlled by the frequency of line cycle signals received by said microprocessor interrupt input.

10. A rodent control device as in claim 8, wherein said coil condition monitoring circuit comprises a resistor and a diode connected in series between said one side of said coil and said one of said first and second power terminals one coil, said coil monitoring lead connecting between a junction between said resistor and diode and said coil monitoring input of said microprocessor.

11. A rodent control device as in claim 8, wherein there are a pair of coils connected in parallel between said switch and said other of said first and second power terminals and a pair of cores with each one being positioned proximate a respective one of said coils and with each said core being connected to one of said first and second power terminals.

12. A rodent control device as in claim 8, and further comprising:
   a) an LED indicator connected between an output pin of said microprocessor and one of said first and second power terminals; wherein
   b) said microprocessor is programmed to send control signals to light said LED indicator at the same rate as the gating pulses are applied to said gate and to stop sending control signals to light said LED when abnormal coil conditions are sensed by said microprocessor.

13. A rodent control device as in claim 8, wherein:
   a) said microprocessor is programmed to periodically stop production of said gate control signals for a predetermined time period and then to résumé production of said gate control signals after said predetermined time period is over.

14. A rodent control device, comprising:
   a) an AC line voltage input with first and second power terminals being respectively connectable to corresponding first and second leads of an AC line voltage source;
   b) a programmed microprocessor;
   c) a power supply connected between said line voltage input and said microprocessor to provide rectified DC power to a power input of said microprocessor;
   d) a coil;
   e) a switch controlled by a gate connected to a control output of said microprocessor, said switch being operative, upon receipt of a gate control signal from said microprocessor to selectively close a circuit between one side of said coil and one of said first and second power terminals, an opposite side of said coil being connected to the other of said first and second power terminals;
   f) a ferrous metal core positioned proximate said coil and being attached to one of said first and second power terminals;
   g) a coil monitoring input to said microprocessor;
   h) a coil condition monitoring circuit connected between said one side of said coil and said one of said first and second power terminals;
   i) a lead connecting said coil condition monitoring circuit to said coil condition input, said microprocessor being programmed to cease sending said gate control signals to said switch gate as long as an abnormal coil condition is sensed by said coil condition monitoring circuit; wherein
   j) one of said first and second power terminals is connected to an interrupt input of said microprocessor to generate an interrupt with each cycle of said line voltage source; and
   k) said microprocessor is programmed to periodically send said gate control signal to said gate based upon a predetermined timing cycle controlled by the frequency of line cycle signals received by said microprocessor interrupt input.

15. A rodent control device as in claim 14, wherein said coil condition monitoring circuit comprises a resistor and a diode connected in series between said one side of said coil and said one of said first and second power terminals one coil, said coil monitoring lead connecting between a junction between said resistor and diode and said coil monitoring input of said microprocessor.

16. A rodent control device as in claim 14, wherein there are a pair of coils connected in parallel between said switch and said other of said first and second power terminals and a pair of cores with each one being positioned proximate a respective one of said coils and with each said core being connected to one of said first and second power terminals.

17. A rodent control device as in claim 14, and further comprising:
   a) an LED indicator connected between an output pin of said microprocessor and one of said first and second power terminals; wherein
   b) said microprocessor is programmed to send control signals to light said LED indicator at the same rate as the gating pulses are applied to said gate and to stop sending control signals to light said LED when abnormal coil conditions are sensed by said microprocessor.

18. A rodent control device as in claim 14, wherein:
   a) said microprocessor is programmed to periodically stop production of said gate control signals for a predetermined time period and then to résumé production of said gate control signals after said predetermined time period is over.

* * * * *